United States Patent [19]

Troyen

[11] 4,352,025
[45] Sep. 28, 1982

[54] SYSTEM FOR GENERATION OF ELECTRICAL POWER

[76] Inventor: Harry D. Troyen, 351 N. 5th St., Reading, Pa. 19606

[21] Appl. No.: 207,274

[22] Filed: Nov. 17, 1980

[51] Int. Cl.³ .................................... F03B 13/00
[52] U.S. Cl. .................................. 290/54; 415/145
[58] Field of Search .............. 290/43, 54, 52; 60/398; 415/145

[56] References Cited

U.S. PATENT DOCUMENTS

| | | | |
|---|---|---|---|
| 716,650 | 12/1902 | Wheeler et al. | 415/145 |
| 1,018,925 | 2/1912 | Pruden | 415/145 |
| 1,946,182 | 2/1934 | Thompson | 415/145 |
| 3,720,840 | 3/1973 | Gregg | 60/398 |
| 3,750,001 | 7/1973 | McCloskey | 290/43 |
| 4,246,753 | 1/1981 | Redmond | 60/398 |

*Primary Examiner*—J. V. Truhe
*Assistant Examiner*—Shelley Wade
*Attorney, Agent, or Firm*—Charles H. Lindrooth; Albert L. Free

[57] ABSTRACT

A hydroelectric generator is located in the basement of a high-rise building and connected in series in the clean waste-water line of the building, to produce electrical power in response to the flow of the waste water from the building. An automatically controlled valve in a bypass line serves to direct excess water flow around the hydroelectric generator unit and maintain the flow through the generator unit at a predetermined maximum level. An automatic switch-over device disconnects the generator output terminals from the electrical output terminals of the unit when the voltage and/or frequency of the generator output is unsatisfactory, e.g., too low.

1 Claim, 6 Drawing Figures

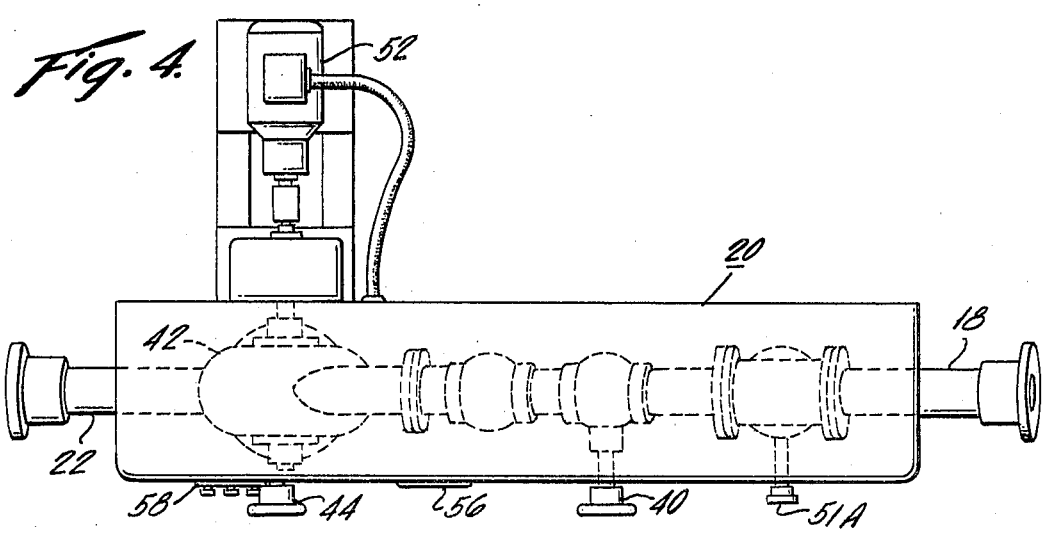
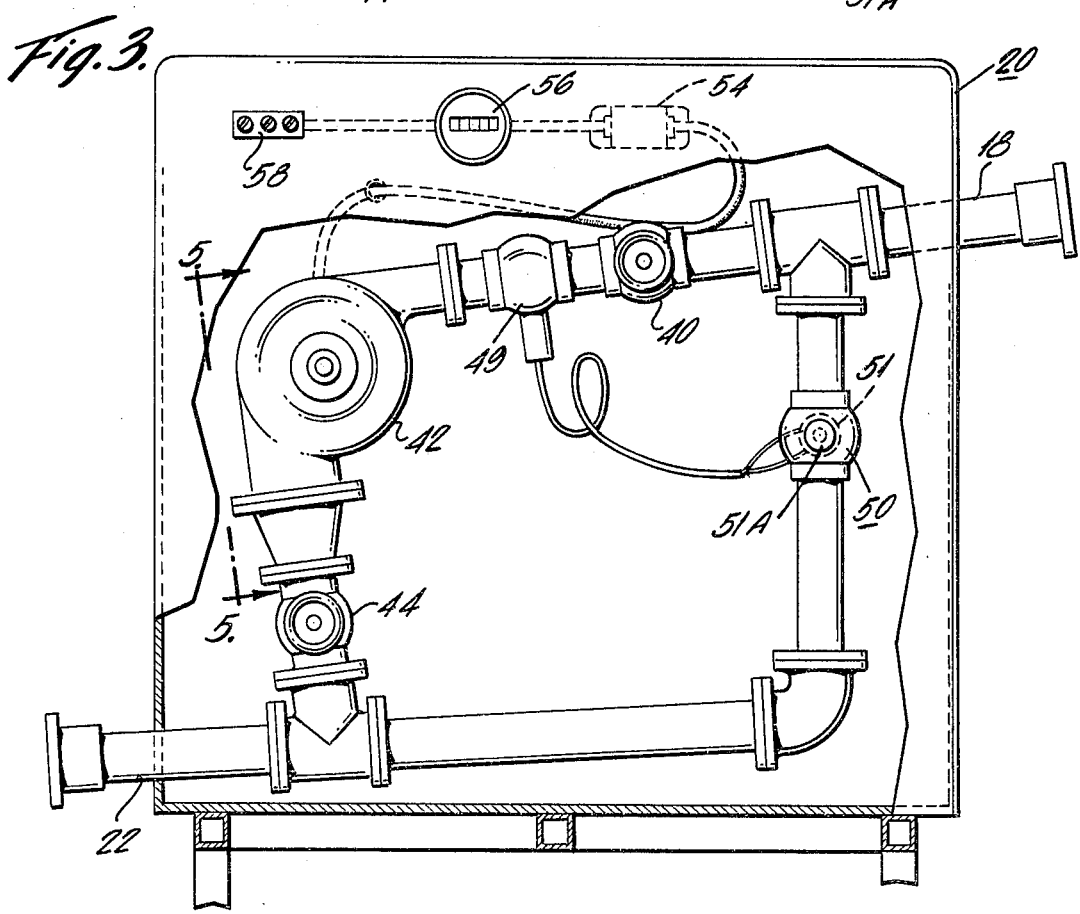
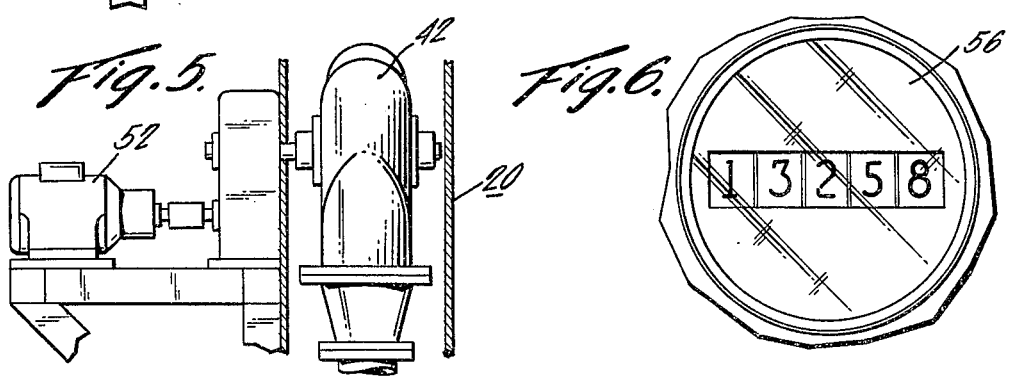

SYSTEM FOR GENERATION OF ELECTRICAL POWER

BACKGROUND OF THE INVENTION

With the increasing scarcity and cost of energy of all forms, it has become increasingly important to develop new sources of energy, particularly those which will generate the energy at convenient locations. Proposals have been made to generate electrical power by hydroelectric generator means located in the inlet water supply pipes to a residence, or in an oil supply line, for example. However, such devices are not, in a general sense, either creators or conservers of energy, since the energy which they produce is merely a conversion of the energy used to drive the liquid through the pipe, and for equivalent performance a pipe containing such generator will require generation of an increased level of energy in order to continue to drive the fluid at the same rate and operate the generator.

Accordingly, it is an object of this invention to provide new and useful apparatus for the generation of electrical power.

Another object is to provide such apparatus which does not rely upon increased use of energy to make it operate, and which utilizes only energy which otherwise would be wasted.

A further object is to provide such apparatus in which the electrical power is generated in convenient locations, without the requirement that it be transported long distances with resultant additional expense and loss of power.

SUMMARY OF THE INVENTION

In accordance with the invention, these and other objects are achieved by the provision of apparatus comprising a high-rise building waste-water conduit system for delivering waste-water from a high-rise building to an external waste-water disposal sewer line, and a hydroelectric generator of electrical power installed in said waste-water conduit system for generating electrical power in response to the flow of waste-water from the conduit system to the sewer line. The high-rise building waste-water conduit system is that which is normally in place in many modern high-rise buildings, and need not be especially constructed for the present purpose; rather, the present system employs such in-place conduit system as a part thereof, and the only additional apparatus is the hydroelectric generator, preferably with suitable controls and monitoring instruments, and which is preferably packaged as a single unit which need only be connected in series with the line from the building wastewater conduit system to the public sewer.

Although such system may be used in such manner that all power generated by the generator is utilized, as for example by using it to charge storage batteries from which the stored electrical energy may be drawn as needed, preferably the system is designed so that the electrical output is connected to the alternating-current electrical service lines automatically only so long as its output is of suitable voltage level and, in the case of an AC system, so long as this output is also of appropriate frequency, but is automatically disconnected when the voltage and/or frequency is not correct.

The water used to actuate the hydroelectric generator preferably is that from the clean waste-water line of the high-rise building, together with the water from storm drains on the building. In an ordinary home such an arrangement would not be practical, because the flow of waste water would occur only on the relatively infrequent occasions when water is being used by the householder or when there has been a heavy rain. In the case of a high-rise building, however, a relatively large continuous supply of waste water will normally be produced, due for example to the large number of sinks in the building, a number of which will generally be operating at the same time, and also due to such special apparatus as air conditioning and heating systems which provide, in many cases, a rather steady flow of overflow waste water.

Preferably, apparatus is also employed which limits the flow of water to the hydroelectric generator to a predetermined maximum level so as to avoid undesired backup of the water when the supply of water is unusually large as by means of automatic water-flow throttling means which automatically bypasses excess flow around the hydraulic generator to the sewer line at such times.

BRIEF DESCRIPTION OF FIGURES

In the drawings:

FIG. 3 is a side view of the interior of one physical form which the hydroelectric unit may take;

FIG. 4 is a top view of the unit of FIG. 3;

FIG. 5 is a fragmentary sectional view taken along lines 5—5 of FIG. 3; and

FIG. 6 is an enlarged fragmentary view of the front face of the kilowatt-hour meter of FIG. 3.

DETAILED DESCRIPTION OF SPECIFIC EMBODIMENTS

These and other objects and features of the invention will be more readily understood from the example now to be described in detail, although it will be understood that the invention is in no way limited to the specific embodiment, which is shown only in the interest of complete definiteness.

Figure 1:
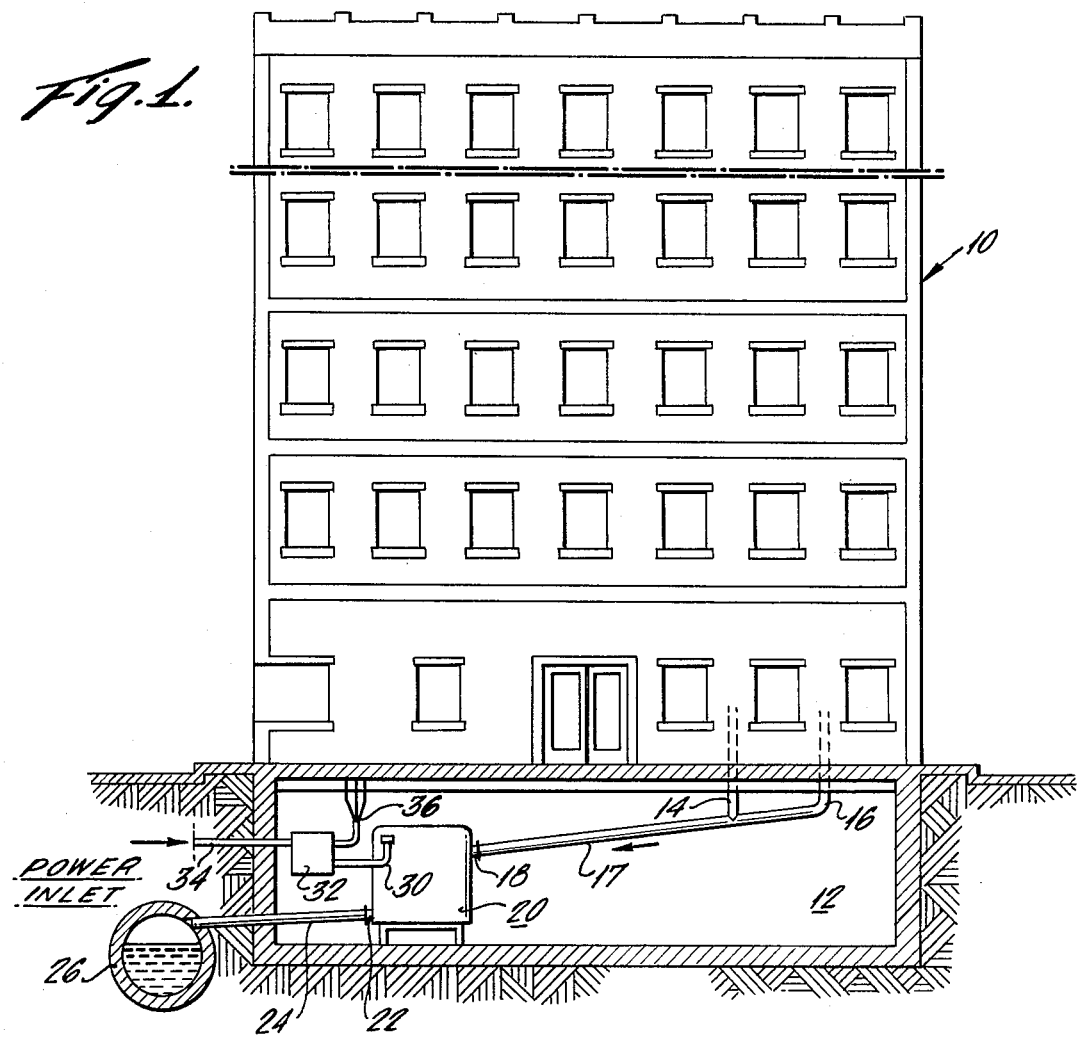
FIG. 1 is a schematic side elevational view of a structure embodying the invention.

Referring now to FIG. 1, there is shown a high-rise building 10, which may for example be a 40-story apartment building, although anything having five or more stories may be considered a high-rise building for the present purposes.

In the basement space 12 beneath the building 10 are shown the lower ends 14 and 16 of the clean-water and the storm-water waste lines, respectively, for the building; the upper parts of these waste-water lines lie within the above-ground portion of the building and are not shown, in the interest of clarity. However, it will be understood that the above-ground portion of the building will normally contain a number of branch lines, as from various sinks or from air conditioning units on the roof, or from any other apparatus producing waste water, which branch lines are merged in the conduit system to supply their liquid effluent to basement waste-water line 14; similarly, the rain water collection system may involve a number of branch conduits, merging eventually into the basement waste-water line 16.

The water from lines 14 and 16 is supplied by the common line 17 to the inlet conduit 18 of hydroelectric unit 20, provided in accordance with the invention, the outlet conduit 22 of which is connected to an effluent line 24 leading to an external sewer pipe 26 of usual type. Hydroelectric unit 20 develops, in response to the flow of waste water through it, electrical power on its electrical output line 30, which power is delivered to an electrical terminal box 32. The latter terminal box receives the usual public-service 3-wire electrical power over electrical input line 34, and delivers electrical power to electrical loads in building 10 over electrical building-supply line 36, in the usual way. Thus the modification of the existing system required by the invention involves merely the inclusion of the hydroelectric unit 20 in the common waste-water line leading to sewer pipe 26, and provision of the electrical output line 30 from the generator output of the hydroelectric unit to the terminal box 32.

Figure 2:
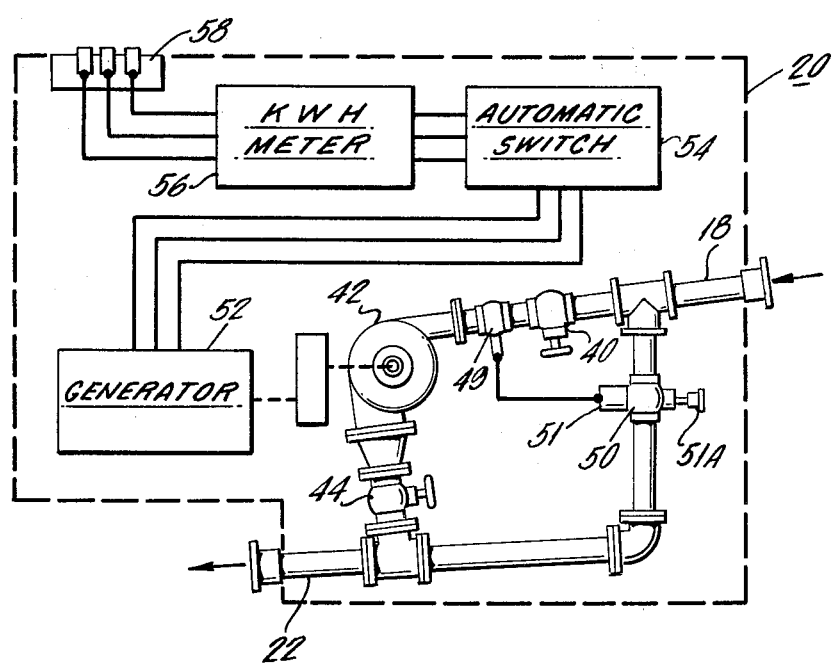
FIG. 2 is a schematic side view of the contents of the hydroelectric unit of FIG. 1.

FIG. 2 is a schematic illustration of a preferred form of contents of the hydroelectric unit 20 of FIG. 1, and parts corresponding to those of FIG. 1 are indicated by corresponding numerals. Thus, inlet waste-water conduit 18 delivers waste water through manual shut-off valve 40 to turbine 42, whence it passes through manual shut-off valve 44 to the building waste-water effluent line 24 for delivery to sewer pipe 26. Manual shut-off valves 40 and 44 permit one to completely shut off the added flow path just described, during installation or repair, for example. An automatic gate valve 50 is in this example connected in shunt with the liquid path through the turbine, and serves to bypass any flow above that which the turbine can properly accommodate; for the latter purpose, a flow-rate sensor device 49 of conventional form is located in the conduit feeding water to the turbine, and is electrically connected to the control element 51 of gate valve 50 to open valve 50 from its normally-closed position progressively further as the flow to turbine 42 tends to increase above a selected level, thereby holding the flow through the turbine substantially constant and preventing back-up of water into inlet conduit 18 under heavy-flow conditions. A manual over-ride control 51A is preferably provided on gate valve 50 to permit it to be held open when manual valves 40 and 44 are closed.

Generator 52 is driven from the rotating shaft of turbine 42, and may be provided with appropriate gearing so that the desired output from the generator will be obtained when the turbine is turning at a convenient rate. A conventional automatic switch 54 delivers output from generator 52 to kilowatt-hour meter 56 and thence to terminal board 58 so long as the turbine is rotating in a desired range of speeds, and is effective to sense when the frequency and voltage of the generator, or either of them, is inappropriate for supply to the terminal board 58 and for delivery over line 30 to service lines both inside and outside of the building, and to open at such times.

In operation then, on any occasion when there is no flow of waste water from the building, as could conceivably occur when the building is closed, the air-conditioning and heating systems are off, and there is no flow of collected rain water, gate valve 50 will be in its fully-closed position to divert a maximum amount of water to the turbine, but there will then be no water to flow through the turbine or to produce electricity from generator 52; at such time, automatic switch 54 will be in its open position, disconnecting the generator output terminals from the terminals at terminal board 58, as desired. Thus, under such unusual condition the system will not in any way interfere with the normal operation of the public service lines supplying electricity to the building facilities.

However, when an adequate supply of waste water occurs, it flows through the turbine 42, operating the generator 52, and the automatic switch 54 will switch the output of the generator to the terminals of terminal board 58 and supply electrical power to the terminals of the electrical terminal box 32 of FIG. 1. Should there be an excessive rate of flow of waste water, gate valve 50 will be modulated to a proportionally more open condition, thus diverting the excess flow directly to the effluent line 24 and to sewer pipe 26 and preventing backup of water in the building wastewater risers. Further, valve 50 will automatically adjust its aperture to maintain the waste-water flow through the turbine at the rate which will drive the turbine at the desired frequency and with the desired output voltage.

It will be understood that, since the risers are those of the waste water system of a high-rise building, not only will there be substantial pressure and a heavy flow at times, but there will be in effect an integration of the waste water flow from various separate sources and a resultant statistical averaging which will tend to produce a more or less constant, ever-present flow through the turbine, so that it will not go in and out of service except under unusual conditions. The kilowatt-hour meter 56 will show the kilowatt hours of electricity which the generator has delivered, and operates in known conventional manner.

FIGS. 3 and 4 show one preferred physical arrangement of the hydroelectric unit 20, with parts corresponding to those of FIG. 2 indicated by corresponding numerals.

FIG. 5 illustrates one possible physical form for the turbine and generator arrangement, which has been found convenient where, as here, the turbine required is of relatively small size. Thus in this example the turbine 42 comprises a relatively small liquid pump, which in other applications would be driven from a suitable motor to drive fluid through its outlet; in this example, however, its outlet is used as the water inlet so that the pump blades are driven by the liquid, which in turn drives the generator. It will be understood that turbines designed especially for this use, having the appropriate water-passing capacity and maximum efficiency under the particular conditions of operation, may be designed and used for this purpose. In this example, the generator 52 and the gear 52A are located outside of the housing 100 of the unit 20.

It is particularly noted that the electrical power generated by the system illustrated is not at the expense of another source of power, but rather the generated electrical power is derived entirely from waste energy, namely the energy of the waste water flowing from the building to the sewer pipe.

As an example only, in an average 40-story building the water flow of clean waste-water from the building may typically vary from 12,000 to 35,000 gallons per minute, and from said flow a steady electrical power output of about 100 KW at 230 volts and 60 hertz may be derived by the hydroelectric unit. Even if this amount of power is not used in the building, the power will be accepted by the public service power line for use elsewhere and will not be wasted. Such flow of power to the public service lines may, if desired, be metered and a reimbursement for it arranged for with the public power company.

It will be understood that flow-monitoring and control equipment more sophisticated than that shown in detail may be utilized in connection with certain practical applications of the invention. For example, if the flow of water through the turbine for any reason becomes too great, resulting in a generator frequency above about 62 hertz in a system designed for connection to a 60 hertz public power line, then not only should the automatic switch open the generator output line to output terminals 58, but it preferably also operates an alarm indicative of such excess frequency so that supervisory personnel will be alerted to check the operation of the gate valve 50 for possible sticking in a closed or insufficiently open condition and to initiate corrective action.

While the invention has been described with particular reference to specific embodiments in the interest of complete definiteness, it will be understood that it may be embodied in a variety of forms diverse from those specifically shown and described, without departing from the spirit and scope of the invention as defined by the appended claims.

What is claimed is:

1. Apparatus for generating electricity, comprising:
  a high-rise building waste water conduit system for delivering waste water from the interior of a high-rise building to an external waste water disposal sewer line;
  a hydroelectric generator of electrical power installed in said waste water conduit system for generating electrical power in response to the flow of water from said conduit system to said sewer line wherein said apparatus comprises a bypass conduit containing a normally-closed type of valve, in parallel with said hydroelectric generator, and means responsive to the rate of flow of said water through said generator for opening said valve progressively further as said flow rate rises above a selected value.

* * * * *